US008918265B2

(12) United States Patent
Kang et al.

(10) Patent No.: US 8,918,265 B2
(45) Date of Patent: *Dec. 23, 2014

(54) METHOD AND APPARATUS FOR CONTROLLING OPERATION OF AN INTERNAL COMBUSTION ENGINE OPERATING IN HCCI COMBUSTION MODE

(75) Inventors: Jun-Mo Kang, Ann Arbor, MI (US); Jyh-Shin Chen, Troy, MI (US); Chen-Fang Chang, Troy, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 385 days.

This patent is subject to a terminal disclaimer.

(21) Appl. No.: 13/352,486

(22) Filed: Jan. 18, 2012

(65) Prior Publication Data

US 2013/0184967 A1   Jul. 18, 2013

(51) Int. Cl.
*F02D 41/24* (2006.01)
*F02D 35/02* (2006.01)
*F02D 41/14* (2006.01)

(52) U.S. Cl.
CPC .............. *F02D 41/14* (2013.01); *F02D 35/026* (2013.01)
USPC .......................................... 701/102; 701/103

(58) Field of Classification Search
CPC . F02D 41/14; F02D 41/1447; F02D 41/3029; F02D 35/026; G06F 17/00
USPC .......... 701/101, 102, 103, 115; 123/435, 436, 123/676, 295
See application file for complete search history.

(56) References Cited

U.S. PATENT DOCUMENTS

| | | | |
|---|---|---|---|
| 7,128,047 B2 | 10/2006 | Kuo et al. | |
| 7,152,559 B2 | 12/2006 | Kuo et al. | |
| 7,228,839 B2 | 6/2007 | Kuo et al. | |
| 7,367,308 B2 | 5/2008 | Kuo et al. | |
| 7,370,633 B2 | 5/2008 | Kang et al. | |
| 7,409,285 B2 | 8/2008 | Kang et al. | |
| 7,802,553 B2 | 9/2010 | Najt et al. | |
| 8,645,044 B2 * | 2/2014 | Wermuth et al. | ............. 701/103 |
| 2006/0196466 A1 | 9/2006 | Kuo et al. | |
| 2006/0243241 A1 | 11/2006 | Kuo et al. | |
| 2010/0107605 A1 | 5/2010 | Brinkman et al. | |

OTHER PUBLICATIONS

U.S. Appl. No. 13/098,550, filed May 2, 2011, Wermuth.

* cited by examiner

*Primary Examiner* — Hai Huynh

(57) ABSTRACT

A method for operating the internal combustion engine includes determining a first integrated thermal state parameter corresponding to engine environment factors affecting a combustion parameter during engine operation in a homogeneous-charge compression-ignition combustion mode. A difference in the first integrated thermal state parameter is determined corresponding to a difference between a monitored state for the combustion parameter and an estimated state for the combustion parameter. The first integrated thermal state parameter is corrected in response to the difference in the integrated thermal state parameter. Operation of the internal combustion engine is controlled in response to the corrected first integrated thermal state parameter.

15 Claims, 6 Drawing Sheets

METHOD AND APPARATUS FOR CONTROLLING OPERATION OF AN INTERNAL COMBUSTION ENGINE OPERATING IN HCCI COMBUSTION MODE

TECHNICAL FIELD

This disclosure relates to an internal combustion engine configured to operate in a homogeneous-charge compression-ignition (HCCI) combustion mode.

BACKGROUND

The statements in this section merely provide background information related to the present disclosure and may not constitute prior art.

Known spark-ignition (SI) engines introduce an air/fuel mixture into each cylinder that is compressed in a compression stroke and ignited by a spark plug. Known compression-ignition (CI) engines inject pressurized fuel into a combustion cylinder near top dead center (TDC) of the compression stroke that ignites upon injection. Combustion for both SI engines and CI engines involves premixed or diffusion flames controlled by fluid mechanics.

SI engines may operate in different combustion modes, including a homogeneous SI combustion mode and a stratified-charge SI combustion mode. SI engines may be configured to operate in a homogeneous-charge compression-ignition (HCCI) combustion mode, also referred to as controlled auto-ignition combustion, under predetermined speed/load operating conditions. HCCI combustion is a distributed, flameless, kinetically-controlled auto-ignition combustion process with the engine operating at a dilute air/fuel mixture, i.e., lean of a stoichiometric air/fuel point, with relatively low peak combustion temperatures, resulting in low NOx emissions. An engine operating in the HCCI combustion mode has a cylinder charge that is preferably homogeneous in composition, temperature, and residual exhaust gases at intake valve closing time. The homogeneous air/fuel mixture minimizes occurrences of rich in-cylinder combustion zones that form smoke and particulate emissions.

Engine airflow may be controlled by selectively adjusting position of the throttle valve and opening and closing of intake valves and exhaust valves. On engine systems so equipped, opening and closing of the intake valves and exhaust valves may be adjusted using a variable valve actuation system that includes variable cam phasing and a selectable multi-step valve lift, e.g., multiple-step cam lobes that provide two or more valve lift positions. In contrast to the throttle position change, the change in valve position of the multi-step valve lift mechanism is a discrete step change.

When an engine operates in a HCCI combustion mode, the engine operates at a lean or stoichiometric air/fuel ratio operation with the throttle wide open to minimize engine pumping losses. When the engine operates in the SI combustion mode, the engine operates at or near stoichiometric air/fuel ratio, with the throttle valve controlled over a range of positions from 0% to 100% of the wide-open position to control intake airflow to achieve the stoichiometric air/fuel ratio.

Combustion during engine operation in the HCCI combustion mode is affected by cylinder charge gas temperature before and during compression prior to ignition and by mixture composition of a cylinder charge. Known engines operating in auto-ignition combustion modes account for variations in ambient and engine operating conditions using calibration tables as part of an overall engine control scheme.

Known HCCI engine control schemes include calibrations for controlling engine parameters using input parameters including, e.g., engine load, engine speed and engine coolant temperature. Cylinder charge gas temperatures may be affected by controlling hot gas residuals via engine valve overlap and controlling cold gas residuals via exhaust gas recirculation. Cylinder charge gas temperatures, pressure, composition may be influenced by engine environment factors, including, e.g., air temperature, humidity, altitude, and fuel parameters, e.g., Reid vapor pressure (RVP), energy content, and quality.

Combustion during engine operation in the HCCI combustion mode may be characterized in terms of combustion heat release, which may include combustion timing relative to piston position. Combustion timing may be described in terms of a mass-burn-fraction, which indicates a piston position at which a portion of the mass fraction of a cylinder charge is burned. A mass-burn-fraction of interest includes a CA50 point (in crank angle relative to TDC) at which an accumulated heat release reaches 50% of a total heat release of a cylinder charge. Known control systems control combustion timing using feedback control algorithms to compensate for a plurality of effects of environmental and ambient parameters on combustion timing and air/fuel ratio. Alternatively, complex multidimensional calibration tables may be used to account for all the engine environment factors.

SUMMARY

A method for operating the internal combustion engine includes determining a first integrated thermal state parameter corresponding to engine environment factors affecting a combustion parameter during engine operation in a homogeneous-charge compression-ignition combustion mode. A difference in the first integrated thermal state parameter is determined corresponding to a difference between a monitored state for the combustion parameter and an estimated state for the combustion parameter. The first integrated thermal state parameter is corrected in response to the difference in the integrated thermal state parameter. Operation of the internal combustion engine is controlled in response to the corrected first integrated thermal state parameter.

BRIEF DESCRIPTION OF THE DRAWINGS

One or more embodiments will now be described, by way of example, with reference to the accompanying drawings, in which.

DETAILED DESCRIPTION

Figure 1:
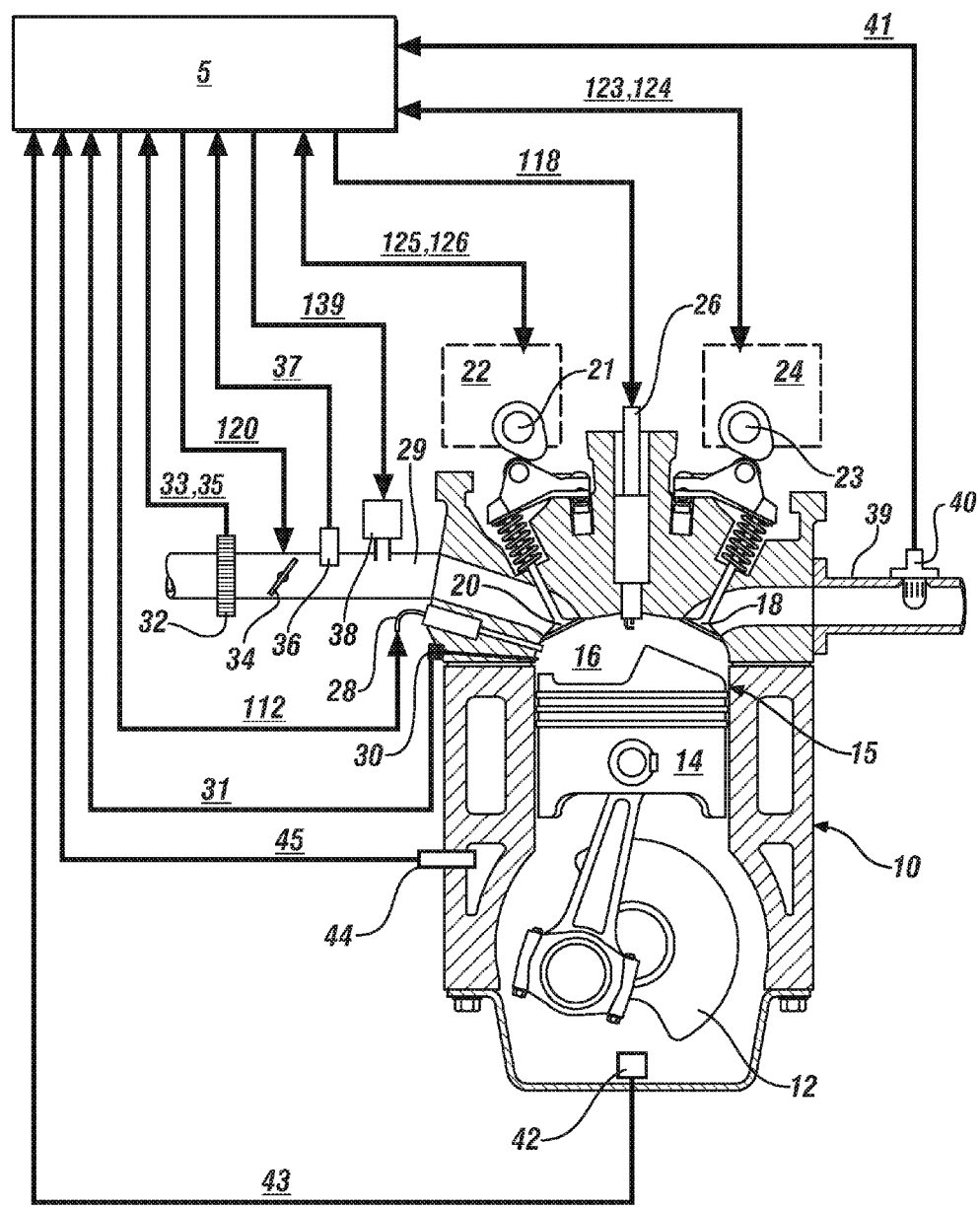
FIG. 1 illustrates a spark-ignition internal combustion engine configured to operate in controlled auto-ignition (HCCI) combustion mode and an accompanying control module, in accordance with the present disclosure.

Referring now to the drawings, wherein the depictions are for the purpose of illustrating certain exemplary embodiments only and not for the purpose of limiting the same, FIG. 1 is a schematic drawing of an internal combustion engine 10 with an accompanying control module 5 that have been constructed in accordance with an embodiment of this disclosure. The engine 10 operates in one of a plurality of selectable combustion modes, including a homogeneous-charge compression-ignition (HCCI) combustion mode and a spark-ignition (SI) combustion mode. The engine 10 is configured to operate at a stoichiometric air/fuel ratio and at an air/fuel ratio that is primarily lean of stoichiometry. The disclosure may be applied to various internal combustion engine systems and combustion cycles.

The exemplary engine 10 includes a multi-cylinder direct-injection four-stroke internal combustion engine having reciprocating pistons 14 slidably movable in cylinders 15 which define variable volume combustion chambers 16. Each piston 14 is connected to a rotating crankshaft 12 by which linear reciprocating motion is translated to rotational motion. An air intake system provides intake air to an intake manifold 29 which directs and distributes air into intake runners of the combustion chambers 16. The air intake system has airflow ductwork and devices for monitoring and controlling the air flow. The air intake devices preferably include a mass airflow sensor 32 for monitoring mass airflow (MAF) 33 and intake air temperature (IAT) 35. A throttle valve 34 preferably includes an electronically controlled device that is used to control airflow to the engine 10 in response to a control signal (ETC) 120 from the control module 5. A pressure sensor 36 in the intake manifold 29 is configured to monitor manifold absolute pressure (MAP) 37 and barometric pressure. An external flow passage recirculates exhaust gases from engine exhaust to the intake manifold 29, having a flow control valve referred to as an exhaust gas recirculation (EGR) valve 38. The control module 5 controls mass flow of exhaust gas to the intake manifold 29 by controlling opening of the EGR valve 38 via EGR command (EGR) 139.

Airflow from the intake manifold 29 into the combustion chamber 16 is controlled by one or more intake valve(s) 20. Exhaust flow out of the combustion chamber 16 is controlled by one or more exhaust valve(s) 18 to an exhaust manifold 39. The engine 10 is equipped with systems to control and adjust openings and closings of the intake and exhaust valves 20 and 18. In one embodiment, the openings and closings of the intake and exhaust valves 20 and 18 may be controlled and adjusted by controlling intake and exhaust variable cam phasing/variable lift control (VCP/VLC) devices 22 and 24 respectively. The intake and exhaust VCP/VLC devices 22 and 24 are configured to control and operate an intake camshaft 21 and an exhaust camshaft 23, respectively. The rotations of the intake and exhaust camshafts 21 and 23 are linked to and indexed to rotation of the crankshaft 12, thus linking openings and closings of the intake and exhaust valves 20 and 18 to positions of the crankshaft 12 and the pistons 14.

The intake VCP/VLC device 22 preferably includes a mechanism operative to switch and control valve lift of the intake valve(s) 20 in response to a control signal (iVLC) 125 and variably adjust and control phasing of the intake camshaft 21 for each cylinder 15 in response to a control signal (iVCP) 126. The exhaust VCP/VLC device 24 preferably includes a controllable mechanism operative to variably switch and control valve lift of the exhaust valve(s) 18 in response to a control signal (eVLC) 123 and variably adjust and control phasing of the exhaust camshaft 23 for each cylinder 15 in response to a control signal (eVCP) 124.

The intake and exhaust VCP/VLC devices 22 and 24 each preferably includes a controllable two-step VLC mechanism operative to control magnitude of valve lift, or opening, of the intake and exhaust valve(s) 20 and 18, respectively, to one of two discrete steps. The two discrete steps preferably include a low-lift valve open position (about 4-6 mm in one embodiment) preferably for low speed, low load operation, and a high-lift valve open position (about 8-13 mm in one embodiment) preferably for high speed and high load operation. The intake and exhaust VCP/VLC devices 22 and 24 each preferably includes a variable cam phasing mechanism to control and adjust phasing (i.e., relative timing) of opening and closing of the intake valve(s) 20 and the exhaust valve(s) 18 respectively. Adjusting phasing refers to shifting opening times of the intake and exhaust valve(s) 20 and 18 relative to positions of the crankshaft 12 and the piston 14 in the respective cylinder 15. The VCP mechanisms of the intake and exhaust VCP/VLC devices 22 and 24 each preferably has a range of phasing authority of about 60°-90° of crank rotation, thus permitting the control module 5 to advance or retard opening and closing of one of intake and exhaust valve(s) 20 and 18 relative to position of the piston 14 for each cylinder 15. The range of phasing authority is defined and limited by the intake and exhaust VCP/VLC devices 22 and 24. The intake and exhaust VCP/VLC devices 22 and 24 include camshaft position sensors to determine rotational positions of the intake and the exhaust camshafts 21 and 23. The VCP/VLC devices 22 and 24 are actuated using one of electro-hydraulic, hydraulic, and electric control force, in response to the respective control signals eVLC 123, eVCP 124, iVLC 125, and iVCP 126.

The engine 10 employs a direct-injection fuel injection system including a plurality of high-pressure fuel injectors 28 that are configured to directly inject a mass of fuel into one of the combustion chambers 16 in response to an injector pulse-width command (INJ_PW) 112 from the control module 5. The fuel injectors 28 are supplied pressurized fuel from a fuel distribution system. The engine 10 employs a spark-ignition system by which spark energy may be provided to a spark plug 26 for igniting or assisting in igniting cylinder charges in each of the combustion chambers 16 in response to a spark command (IGN) 118 from the control module 5.

The engine 10 is equipped with various sensing devices for monitoring engine operation, including a crank sensor 42 having an output indicative of crankshaft rotational position, i.e., crank angle and speed (RPM) 43. A temperature sensor 44 is configured to monitor coolant temperature 45. An in-cylinder combustion sensor 30 is configured to monitor combustion, and is a cylinder pressure sensor operative to monitor in-cylinder combustion pressure 31 in one embodiment. An exhaust gas sensor 40 is configured to monitor an exhaust gas parameter 41, e.g., air/fuel ratio (AFR). The combustion pressure 31 and the RPM 43 are monitored by the control module 5 to determine combustion timing, i.e., timing of combustion pressure relative to the crank angle of the crankshaft 12 for each cylinder 15 for each combustion cycle. It is appreciated that combustion timing may be determined by other methods. The combustion pressure 31 may be monitored by the control module 5 to determine an indicated mean effective pressure (IMEP) for each cylinder 15 for each combustion cycle. Preferably, the engine 10 and control module 5 are configured to monitor and determine states of IMEP for each of the engine cylinders 15 during each cylinder firing event. Alternatively, other sensing systems may be used to monitor states of other combustion parameters within the scope of the disclosure, e.g., ion-sense ignition systems, EGR fractions, and non-intrusive cylinder pressure sensors.

Control module, module, control, controller, control unit, processor and similar terms mean any one or various combinations of one or more of Application Specific Integrated Circuit(s) (ASIC), electronic circuit(s), central processing unit(s) (preferably microprocessor(s)) and associated memory and storage (read only, programmable read only, random access, hard drive, etc.) executing one or more software or firmware programs or routines, combinational logic circuit(s), input/output circuit(s) and devices, appropriate signal conditioning and buffer circuitry, and other components to provide the described functionality. Software, firmware, programs, instructions, routines, code, algorithms and similar terms mean any controller executable instruction sets including calibrations and look-up tables. The control module has a set of control routines executed to provide the desired functions. Routines are executed, such as by a central processing unit, and are operable to monitor inputs from sensing devices and other networked control modules, and execute control and diagnostic routines to control operation of actuators. Routines may be executed at regular intervals, for example each 3.125, 6.25, 12.5, 25 and 100 milliseconds during ongoing engine and vehicle operation. Alternatively, routines may be executed in response to occurrence of an event.

In operation, the control module 5 monitors inputs from the aforementioned sensors to determine states of engine parameters. The control module 5 is configured to receive input signals from an operator (e.g., via an accelerator pedal and a brake pedal) to determine an operator torque request, from which an engine torque command is derived. The control module 5 executes algorithmic code stored therein to control the aforementioned actuators to form a cylinder charge, including controlling throttle position, spark-ignition timing, fuel injection mass and timing, EGR valve position to control flow of recirculated exhaust gases, and intake and/or exhaust valve timing and phasing. Valve timing and phasing may include negative valve overlap (NVO) and lift of exhaust valve reopening (in an exhaust re-breathing strategy), and positive valve overlap (PVO). The control module 5 is configured to execute an engine fuel cutoff (FCO) event. Engine FCO may be executed when an operator removes their foot from an accelerator pedal, resulting in vehicle coasting. In response, the engine may still continue to spin, but engine fueling is cutoff to reduce fuel consumption. When the operator subsequently applies pressure to the accelerator pedal, engine fueling is restored, and the engine fires and generates torque. The control module 5 may control the engine 10 using autostart and autostop control schemes during ongoing vehicle operation, and may operate to selectively deactivate a portion of the combustion chambers 15 or a portion of the intake and exhaust valves 20 and 18 through control of fuel, spark and valve deactivation. The control module 5 may control air/fuel ratio based upon feedback from the exhaust gas sensor 40.

During engine operation in the spark-ignition combustion (SI) mode, the throttle valve 34 is controlled to regulate the air flow. The engine 10 may be controlled to a stoichiometric air/fuel ratio with the intake and exhaust valves 20 and 18 in the high-lift valve open position and the intake and exhaust lift timing operating with a positive valve overlap. Preferably, a fuel injection event is executed during intake or compression phase of an engine cycle, preferably substantially before TDC. Spark-ignition is preferably discharged at a predetermined time subsequent to the fuel injection when air charge within the cylinder is substantially homogeneous.

The control module 5 transitions engine operation to a preferred combustion mode associated with operating the engine 10 in the HCCI combustion mode or the SI combustion mode to increase fuel efficiencies and engine stability, and/or decrease emissions in response to the operator torque request. A change in one of the engine parameters, e.g., speed or load, may effect a change in an engine operating zone. The control module 5 commands a change in the preferred combustion mode associated with a change in the engine operating zone.

When the engine 10 is operating in the HCCI combustion mode, combustion and combustion timing may be described in context of combustion heat release during a cylinder event, e.g., a magnitude and timing of combustion heat release during cylinder events. The magnitude and timing of the combustion heat release may be indicated by cylinder pressure, a mass-burn-fraction or other parameters.

When the engine 10 is operating in the HCCI combustion mode, there is a preferred combustion timing that corresponds to an operator torque request and a present engine operating point, which is defined as an engine speed/load point. The preferred combustion timing is affected by combustion temperature. A single integrated thermal state parameter, referred to herein as an effective temperature $T_{EFF}$ is employed to account for a plurality of engine environment factors affecting the combustion temperature and thus affecting combustion timing during operation in the HCCI combustion mode. The effective temperature $T_{EFF}$ preferably supplants coolant temperature in engine combustion control schemes. The engine environment factors affect operation of the engine 10 when operating in the HCCI combustion mode by influencing temperature, pressure, and composition of a cylinder charge, thus affecting the combustion timing as indicated by a CA50 mass-burn-fraction point. The effective temperature $T_{EFF}$ provides a single parameter that accounts for the engine environment factors and thus reduces complexity of HCCI engine calibration and control schemes.

The effective temperature $T_{EFF}$ is determined by aggregating engine environment factors in relation to their effect upon combustion timing, e.g., the magnitude and timing of combustion heat release during each cylinder event. Exemplary engine environment factors may include coolant temperature, engine load history, ambient air humidity, altitude, fuel quality, and combustion chamber deposits. The effects of the engine environment factors may be correlated to cylinder pressure and the combustion timing, which may be determined from measurements of engine crank angle, cylinder pressure, combustion timing and estimations correlated to or otherwise ascertained from engine operation.

An equation for determining an initial state for the effective temperature $T_{EFF\text{-}INIT}$ by aggregating engine environment factors in relation to their individual effects upon combustion timing may be represented as follows:

$$T_{EFF\text{-}INIT} = \Sum_{i=1}^{n} fi(T_i) \quad [1]$$

wherein $fi(T_i)$ is an array of the engine environment factors including elements that are arithmetically combined to determine the initial effective temperature $T_{EFF\text{-}INIT}$. Thus, the initial effective temperature $T_{EFF\text{-}INIT}$ is an aggregation of the engine environment factors affecting combustion timing when operating the engine in HCCI combustion mode, and is employable in an engine control scheme. An embodiment of Eq. 1 is set forth as follows.

$$T_{EFF\text{-}INIT} = f_1(T_1) + f_2(T_2) + f_3(T_3) + f_4(T_4) + f_5(T_5) + f_6(T_6) + f_7(T_7) \quad [2]$$

The aggregated engine environment factors may include the following factors:

$T_1 = T_C$, which is coolant temperature;

$T_2 = T_{LOAD}$, which is a temperature bias term corresponding to engine load and engine load history;

$T_3 = T_{INT}$, which is a temperature bias term corresponding to intake air temperature;

$T_4 = T_{HUM}$, which is a temperature bias term corresponding to ambient humidity;

$T_5 = T_{ALT}$, which is a temperature bias term corresponding to altitude $T_6 = T_{FUEL}$, which is a temperature bias term corresponding to fuel quality; and $T_7 = T_{DEP}$, which is a temperature bias term corresponding to combustion chamber deposits.

Other engine environment factors that affect combustion timing may be incorporated without limitation. It is appreciated that the temperature bias terms are preferably employed to adjust the coolant temperature term, thus compensating for any effect upon combustion timing in relation to the coolant temperature term. A value for the effective temperature $T_{EFF}$ may instead be determined by multiplying terms corresponding to the engine environment factors. In one embodiment the temperature bias term corresponding to fuel quality $T_{FUEL}$ correlates to specific heat capacity of the engine fuel, which may be monitored or otherwise determined during ongoing engine operation.

Actual combustion timing in individual engines may be affected by variations associated with component manufacturing, aging, deterioration and other in-use conditions and factors. Such variations may be stochastic in nature, and not readily compensated for during ongoing use. Thus, Eq. 1 is expanded to calculate a single integrated thermal state parameter that is updated in real-time in response to changing conditions that affect combustion timing, as follows:

$$T_{EFF} = a_0 + \Sum_{i=1}^{n} a_i * fi(T_i) \quad [3]$$

wherein $f_i(T_i)$ is the array of engine environment factors, n is quantity of parameters in $f_i(T_i)$, and $a_0$ is a bias term. The $a_i$ terms are multiplicative weighting factors, each corresponding to contribution of one of the n parameters. The $a_0$ term and the $a_i$ terms may be determined based on errors in predetermined contributions of the array of engine environment factors $F(T_i)$ that manifests as a deviation from a measured combustion variable. In one embodiment the measured combustion variable is combustion pressure 31, which may be used to determine combustion timing. Other measured combustion variables may be used to similar effect.

The effective temperature $T_{EFF}$ determined using Eq. 3 is preferably employed to adjust control states of engine actuators in a feed-forward approach using a single set of calibration tables, wherein each of the calibration tables is preferably arranged as a two-dimensional array corresponding to engine speed and load. This avoids the use of complex calibration tables and the need for multiple term feedback combustion control. The contribution of each parameter on the effective temperature $T_{EFF}$ is determined and the calibration is based upon the effective temperature $T_{EFF}$ instead of a single one of the parameters, e.g., coolant temperature. An exemplary control scheme employing the effective temperature $T_{EFF}$ is described herein, and includes a preferred state for an engine control parameter, e.g., a target combustion timing, for a combination of engine load, engine speed and the effective temperature $T_{EFF}$.

During ongoing engine operation, a state for the effective temperature $T_{EFF}$ is iteratively determined by measuring or otherwise determining present operating states for each of the engine environment factors and combining them as shown with reference to Eq. 3, above. An optimization and learning algorithm can be executed in real-time to determine states for the weighting factors $a_i$ over a wide range of operating conditions in response to a deviation in the combustion timing. The weighting factors $a_i$ are used to correct the contribution of $i^{th}$ parameter in the array of engine environment factors $f_i(T_i)$ and improve the feed-forward control of the engine to achieve a preferred combustion timing in response to an operator torque request.

Figure 2:
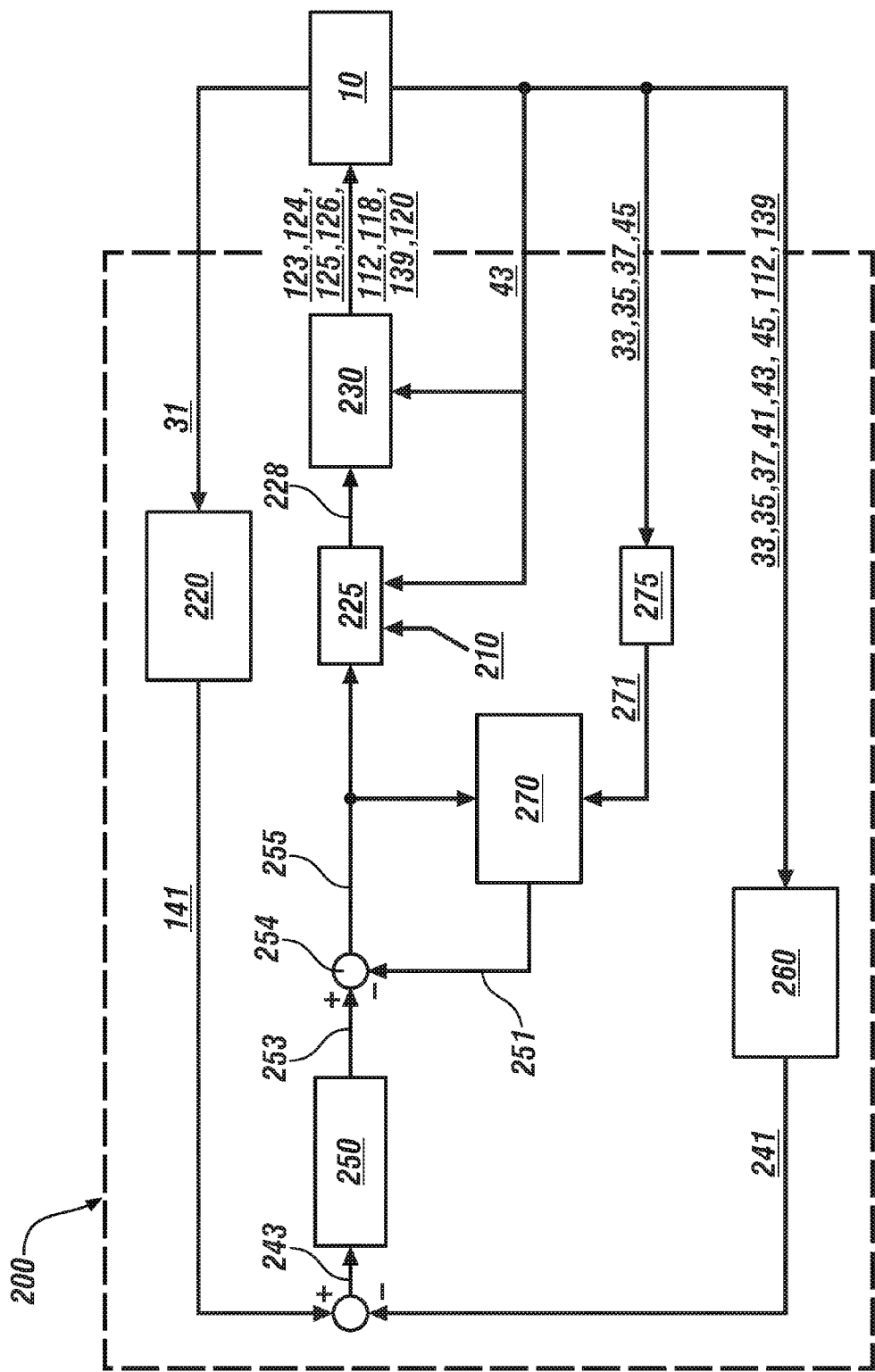
FIGS. 2 and 3 illustrate elements of a control scheme configured to operate an internal combustion engine in an HCCI combustion mode using a single integrated thermal state parameter as a control parameter, in accordance with the disclosure.

FIG. 2 schematically shows a control scheme 200 configured to operate an embodiment of the engine 10 operating in the HCCI combustion mode employing the effective temperature described with reference to Eq. 3 as a control parameter. During operation of the engine 10 in HCCI combustion mode, engine operating parameters are monitored, preferably including the combustion pressure 31, coolant temperature 45, RPM 43, MAP 37, IAT 35, MAF 33, and the monitored engine states associated with combustion performance, including the in-cylinder combustion pressure 31 and AFR 41. The INJ_PW command 112 and EGR command 139 are also monitored. The combustion timing calculation element 220 calculates a combustion timing parameter 141, which is described herein as an indicated CA50 mass-burn-fraction point that has been derived using the in-cylinder combustion pressure 31. It is appreciated that the control scheme 200 may employ other combustion timing parameters to achieve similar results. A combustion timing prediction algorithm 260 employs a suitable engine operation simulator to estimate or otherwise determine a combustion parameter 241 using the aforementioned engine operating parameters including the combustion pressure 31, coolant temperature 45, RPM 43, MAP 37, IAT 35, MAF 33, the AFR 41, the INJ_PW command 112 and the EGR command 139. The estimated combustion parameter 241 may be a CA50 mass-burn-fraction point or another suitable combustion parameter calculable using the aforementioned engine operating parameters.

Control element 250 employs a difference 243 between indicated CA50 mass-burn-fraction point 141 and the estimated CA50 mass-burn-fraction point 241 to determine an effective temperature difference ($\Delta T_{EFF}$) 253. This may include determining a first effective temperature corresponding to the indicated CA50 mass-burn-fraction point 141, determining a second effective temperature corresponding to the estimated CA50 mass-burn-fraction point 241, and calculating a difference therebetween to determine $\Delta T_{EFF}$ 253. Other methods to determine $\Delta T_{EFF}$ 253 may be used with similar results.

The coolant temperature 45, RPM 43, MAP 37, IAT 35, MAF 33, and the INJ_PW command 112 and EGR command 139 are used to determine states related to coolant temperature, engine load and engine load history, ambient air temperature, ambient air humidity, altitude, fuel quality, combustion deposits and other engine-related environmental factors. The engine-related environmental factors employed to determine the effective temperature preferably include the aforementioned factors recited with reference to Eq. 2, including $T_C$, $T_{LOAD}$, $T_{INT}$, $T_{HUM}$, $T_{ALT}$, $T_{FUEL}$, and $T_{DEP}$. Control element 275 converts the coolant temperature 45, RPM 43, MAP 37, IAT 35, MAF 33, and the INJ_PW command 112 and EGR command 139 into the array of engine environment factors $f_i(T_i)$ 271 that includes $T_C$, $T_{LOAD}$, $T_{INT}$, $T_{HUM}$, $T_{ALT}$, $T_{FUEL}$, and $T_{DEP}$.

Contributions of the various engine environment factors including the aforementioned bias factors recited with reference to Eq. 2, including $T_C$, $T_{LOAD}$, $T_{INT}$, $T_{HUM}$, $T_{ALT}$, $T_{FUEL}$, and $T_{DEP}$ may be determined during calibration development exercises. An exemplary calibration development exercise includes a process wherein all but one of the engine environment factors is set and controlled to nominal states. A selected one of the engine environment factors that is not set is controlled to one of a plurality of states selected from a range of states between a minimum state and a maximum state, and the magnitude and timing of the combustion heat release are determined, e.g., by determining a CA50 mass-burn-fraction point at each of the plurality of states. An effect on the combustion heat release is determined, as compared to a preferred magnitude and timing of the combustion heat release for the operating point using Eq. 3. The effect on the combustion heat release is used to calculate temperature bias terms associated with the selected one of the engine environment factors. This process is preferably repeated over a range of engine speed and load operating conditions. Thus, a calibration corresponding to engine speed and load may be developed for the selected one of the engine environment factors. The calibration development exercise is repeated to develop a calibration for each of the engine environment factors associated with the initial effective temperature $T_{EFF-INIT}$ using combinations of all but one of the engine environment factors at known states and systematically controlling a selected one of the engine environment factors across a plurality of discrete steps over an expected operating range. This action permits execution of a straightforward calibration process for each of the engine environment factors. In operation, an initial effective temperature $T_{EFF-INIT}$ corresponding to the known states of the engine environment factors at each operating point may be determined based thereon.

Figure 3:
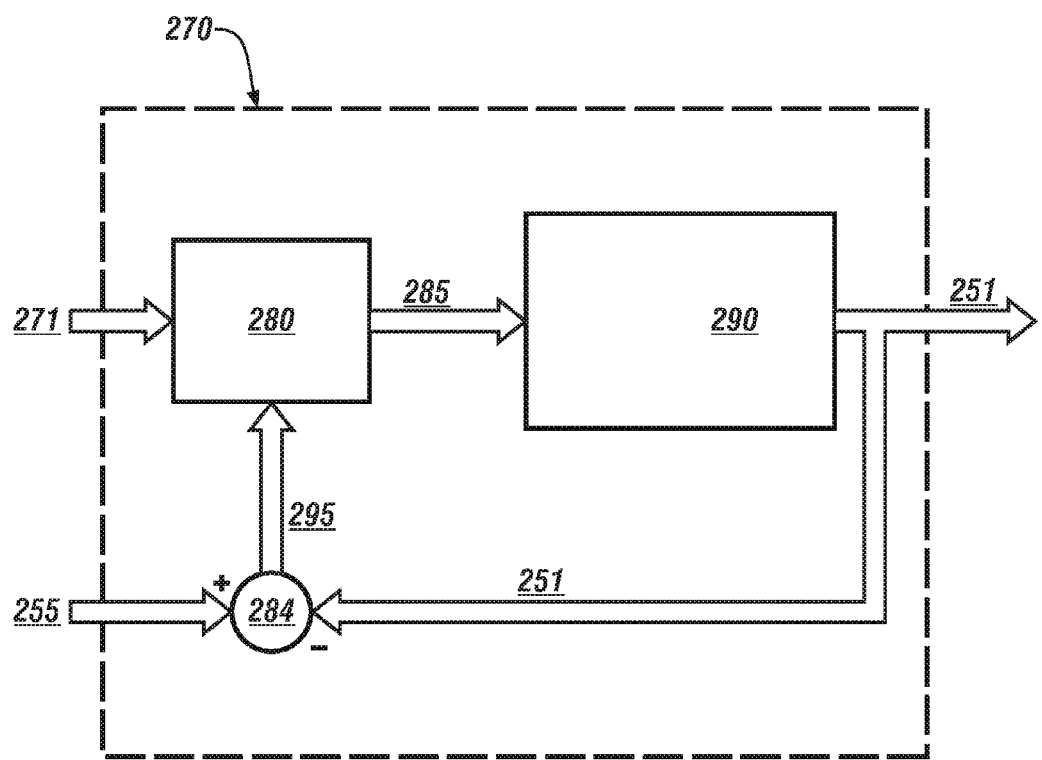

The array of engine environment factors $f_i(T_i)$ 271 including $T_C$, $T_{LOAD}$, $T_{INT}$, $T_{HUM}$, $T_{ALT}$, $T_{FUEL}$, and $T_{DEP}$ is input to a learning controller 270. FIG. 3 schematically shows details of an embodiment of the learning controller 270 including a learning algorithm 280, a feed-forward algorithm 290 for calculating a feed-forward effective temperature $(T_{EFF-FFD})$ 251, and a difference element 284. The learning controller 270 preferably executes in real-time to determine states for the weighting factors $a_i$ over a wide range of operating conditions. The weighting factors $a_i$ are used to correct the contribution of $i^{th}$ parameter in the array of engine environment factors $f_i(T_i)$ and improve the feed-forward control based upon deviation of combustion timing.

The feed-forward algorithm 290 calculates the feed-forward effective temperature $(T_{EFF-FFD})$ 251 using the adaptive strategy described with reference to Eq. 3, which is repeated for ease of description:

$$T_{EFF}=a_0+\Sigma_{i=1}^{n}a_i*f_i(T_i) \quad [3]$$

wherein Eq. 3 employs the array of engine environment factors $f_i(T_i)$ 271 and an array of weighting terms $a_i$ 285 from the learning algorithm 280 to calculate $T_{EFF-FFD}$ 251. The learning algorithm 280 employs the array of engine environment factors $f_i(T_i)$ 271 and an effective temperature error term $(T_{EFF-ERR})$ 295 to determine states for the weighting terms $a_i$ 285 from the learning algorithm 280. Each of the weighting terms $a_i$ 285 is a multiplicative weighting factor corresponding to a contribution of one of the i parameters from the array of engine environment factors $f_i(T_i)$ 271 upon the combustion timing. The learning algorithm 280 employs one of a Kalman filter, a recursive least-squares approximation or a Kaczmarz's projection algorithm to determine and update each of the weighting terms $a_i$ 285 using error statistics associated with effective temperature error term $(T_{EFF-ERR})$ 295 and the array of engine environment factors $f_i(T_i)$ 271. The effective temperature error term $(T_{EFF-ERR})$ 295 is a difference between the feed-forward effective temperature $(T_{EFF-FFD})$ 251 and a corrected effective temperature $(T_{EFF-CORR})$ 255.

Referring to FIG. 2 again, the corrected effective temperature $(T_{EFF-CORR})$ 255 is an arithmetic sum (254) of the feed-forward effective temperature $(T_{EFF-FFD})$ 251 and the effective temperature difference $(\Delta T_{EFF})$ 253. The corrected effective temperature $(T_{EFF-CORR})$ 255 is used in an engine calibration scheme 225 with the operator torque request 210 and RPM 43 to determine preferred engine operating parameters 228 including, e.g., a preferred air/fuel ratio and a preferred EGR mass fraction.

The preferred engine operating parameters 228 are provided as inputs to a combustion controller 230. The combustion controller 230 executes algorithms to determine preferred control states for various actuators in response to the operator torque request to achieve targets for engine operation. The preferred control states or commands for various engine control actuators preferably include INJ_PW 112, IGN 118, ETC 120, EGR 139, eVLC 123, eVCP 124, iVLC 125, and iVCP 126.

Figure 4:
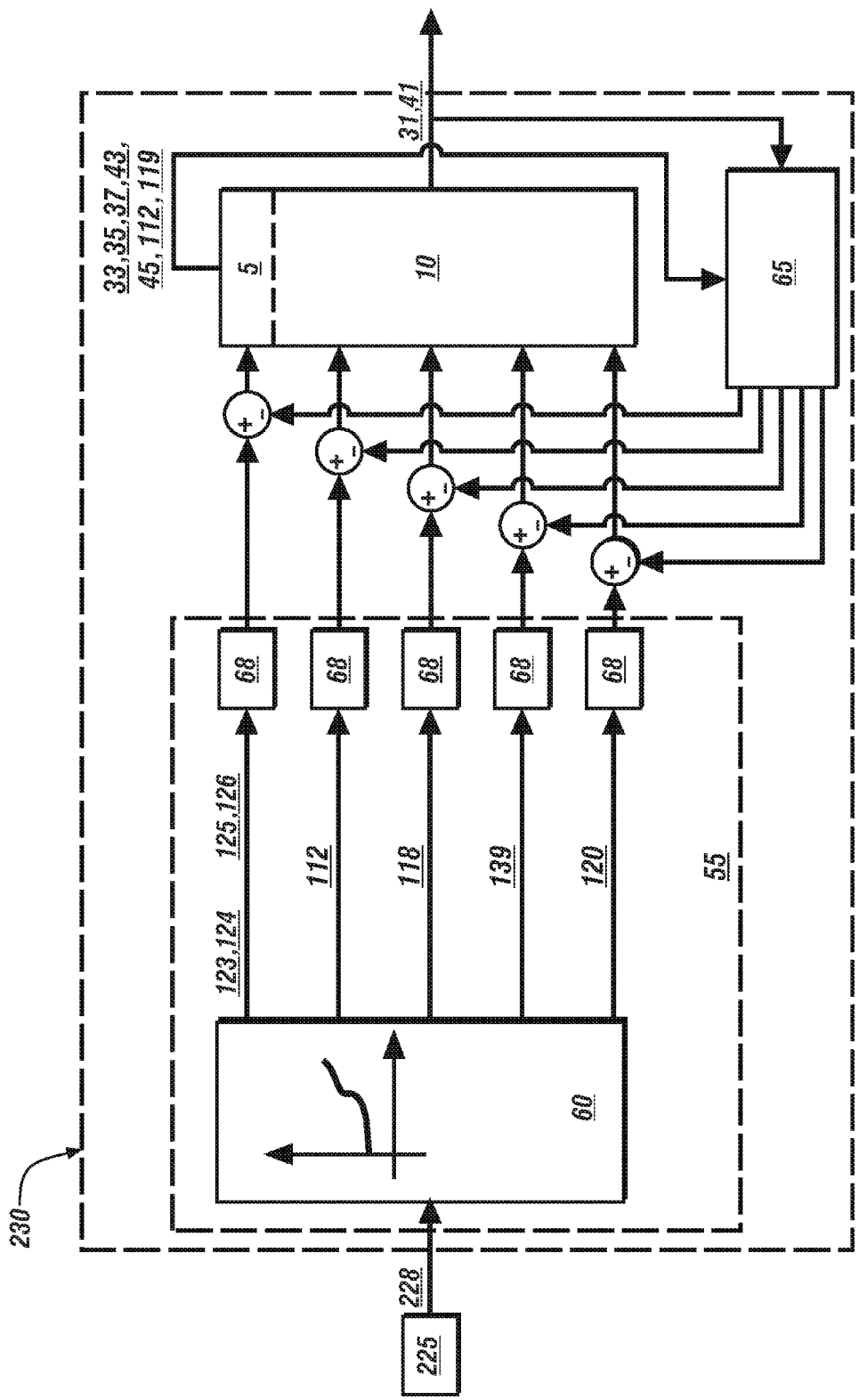
FIG. 4 illustrates an engine combustion controller including a feed-forward control scheme and a feedback control scheme for controlling and operating the exemplary engine in the HCCI combustion mode, in accordance with the disclosure.

FIG. 4 schematically shows an engine combustion controller 230 including a feed-forward control scheme 55 and a feedback control scheme 65 for controlling and operating the exemplary engine 10 in the HCCI combustion mode in response to preferred engine operating parameters 228 output from the engine calibration scheme 225. The engine combustion controller 230 preferably consists of algorithmic code and calibration tables stored in one of the memory devices of the engine control module 5 for execution therein. The engine combustion controller 230 uses the preferred engine operating parameters 228 including, e.g., the preferred air/fuel ratio and the preferred EGR mass fraction to determine preferred control states for various actuators to meet the operator torque request and achieve targets for engine operation. The monitored engine states associated with combustion performance including combustion pressure 31 are preferably translatable to combustion parameters that are measures of combustion timing and burn duration occurring during engine operation in the HCCI combustion mode. The combustion timing is preferably the CA50 mass-burn-fraction point. The burn duration is defined as the crank angle interval, in crank angle degrees between 10 and 90% mass-burn-fraction points. The feedforward control scheme 55 and the feedback control scheme 65 are preferably executed as part of ongoing engine control to achieve a rapid and effective system response to changes of operating conditions in response to changes in the operator inputs and ambient conditions.

The feedforward control scheme 55 includes a control model 60 including precalibrated look-up tables and algorithms, and a plurality of rate limiters 68. The precalibrated look-up tables and algorithms of the control model 60 include machine-searchable arrays stored in memory devices and machine-executable algorithms to determine commands for each of the engine control actuators in response to the preferred engine operating parameters 228. The commands for each of the engine control actuators are used to control operation of the engine 10 to achieve the preferred combustion timing while considering the engine environment factors. The engine control actuator commands include ETC 120, EGR 139, IGN 118, INJ_PW 112, eVLC 123, eVCP 124, iVLC 125, and iVCP 126. The preferred monitored engine operating states include, e.g., RPM 43, MAP 37, IAT 35, MAF 33, coolant 45, INJ_PW 112 and the effective temperature $T_{EFF}$ 119. The control states for each of the engine control actuators include actuator-appropriate command signals to control operation of the actuators to achieve target engine operation as indicated by the engine operating point and the monitored engine states associated with the EGR mass fraction and AFR 41. The EGR mass fraction may be measured or correlated to the monitored engine states. The feed-forward control states for the engine control actuators are subjected to one of the plurality of feed-forward rate-limiters 68. The feedback control scheme 65 monitors the aforementioned engine operating states and the monitored engine states associated with EGR mass fraction and AFR 41 to determine adjustments for the engine control actuator commands of the ETC 120, EGR 139, IGN 118, INJ_PW 112, eVLC 123, eVCP 124, iVLC 125, and iVCP 126 using known feedback control strategies. The rate-limited feed-forward control states for the engine control actuators are adjusted using the feedback control scheme 65, and the engine 10 is controlled thereby.

Figure 5:
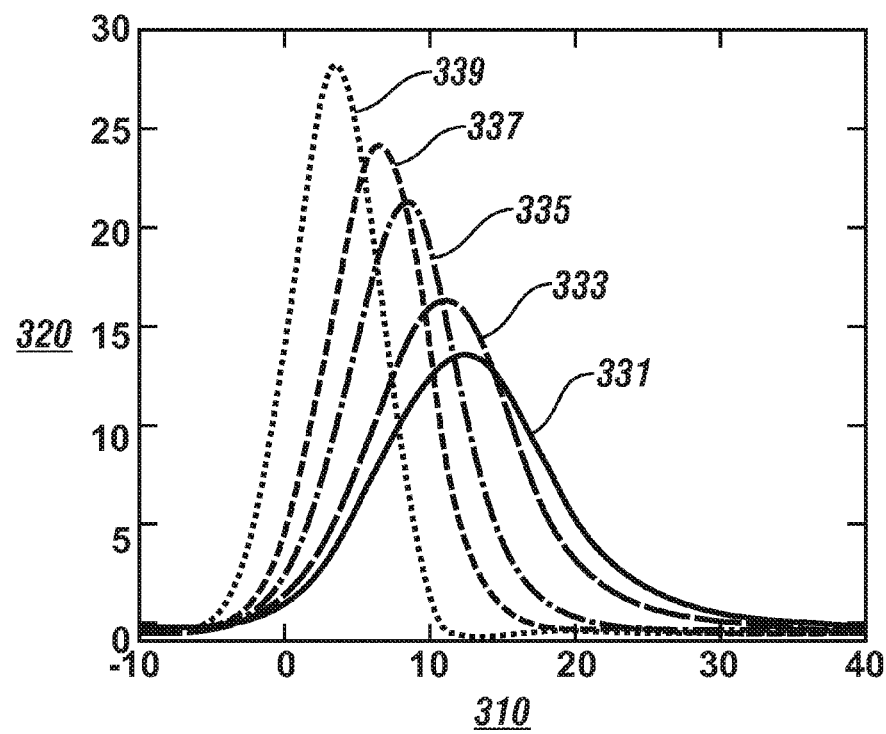
FIG. 5 illustrates a rate of combustion heat release plotted against piston position around TDC for a range of intake air temperatures for an exemplary internal combustion engine operating in HCCI combustion mode, in accordance with the disclosure.

FIG. 5 graphically depicts a rate of combustion heat release 320 (J/CA) plotted against piston position around TDC 310 (CA deg aTDC) for a range of intake air temperatures, including 75° C. 331, 85° C. 333, 95° C. 335, 105° C. 337, and 115° C. 339 for an exemplary internal combustion engine operating in HCCI combustion mode, indicating an advance in combustion timing, i.e., movement toward TDC and an increase in peak heat release with increasing intake air temperature.

Figure 6:
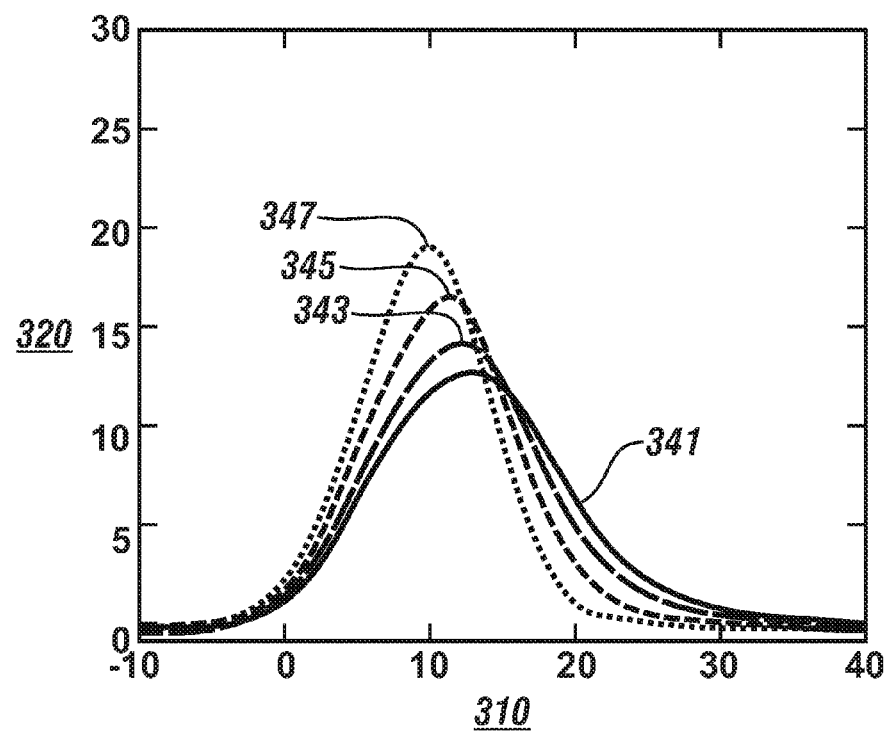
FIG. 6 illustrates a rate of combustion heat release plotted against piston position around TDC for a range of coolant temperatures for an exemplary internal combustion engine operating in HCCI combustion mode, in accordance with the disclosure.

FIG. 6 graphically depicts a rate of combustion heat release 320 (J/CA) plotted against piston position around TDC 310 (CA deg aTDC) for a range of coolant temperatures including 80° C. 341, 85° C. 343, 90° C. 345, and 95° C. 347 for an exemplary internal combustion engine operating in HCCI combustion mode, indicating an advance in combustion timing, i.e., movement toward TDC and increase in peak heat release with increasing coolant temperature.

Figure 7:
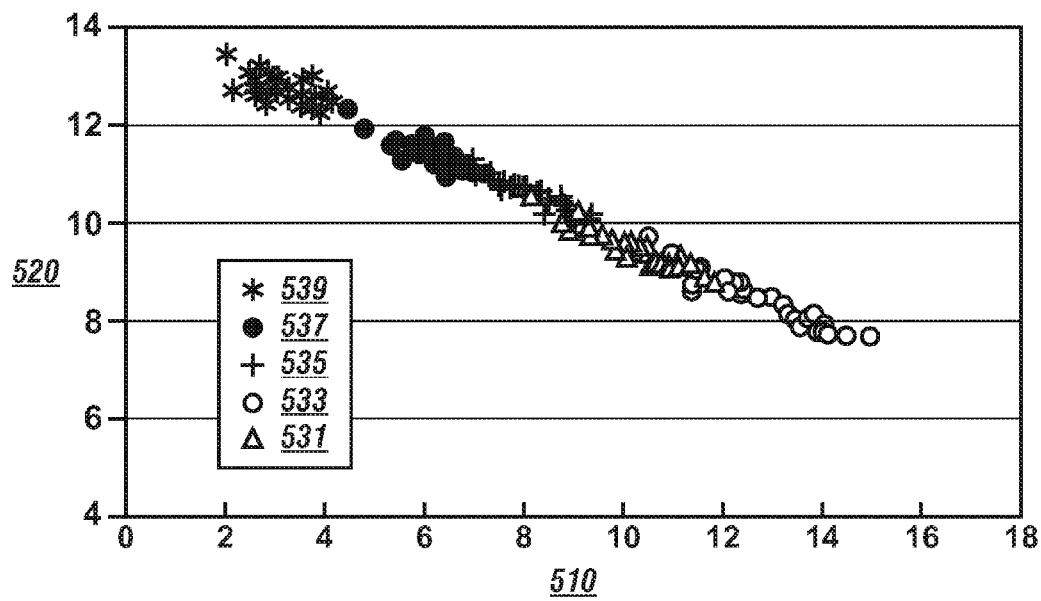
FIG. 7 illustrates a ratio of peak cylinder pressure in relation to indicated mean effective pressure (IMEP) plotted in relation to combustion timing, i.e., CA50 mass-burn-fraction points for intake air temperature states for an exemplary internal combustion engine operating in HCCI combustion mode in accordance with the disclosure.

FIG. 7 graphically depicts a ratio of peak cylinder pressure in relation to IMEP 520 plotted in relation to combustion timing, i.e., CA50 mass-burn-fraction 510 (CA deg aTDC) for intake air temperature states including 75° C. 531, 85° C. 533, 95° C. 535, 105° C. 537, and 115° C. 539 for an exemplary internal combustion engine operating in HCCI combustion mode, indicating an advance in combustion timing, i.e., movement toward TDC, and increase in peak cylinder pressure in relation to IMEP with increasing intake air temperature. The data indicates that the contribution of the intake air temperature on the effective temperature $T_{EFF}$ may be determined by evaluating the relationship between the output parameters of combustion performance and combustion timing and the input parameter of intake air temperature.

Figure 8:
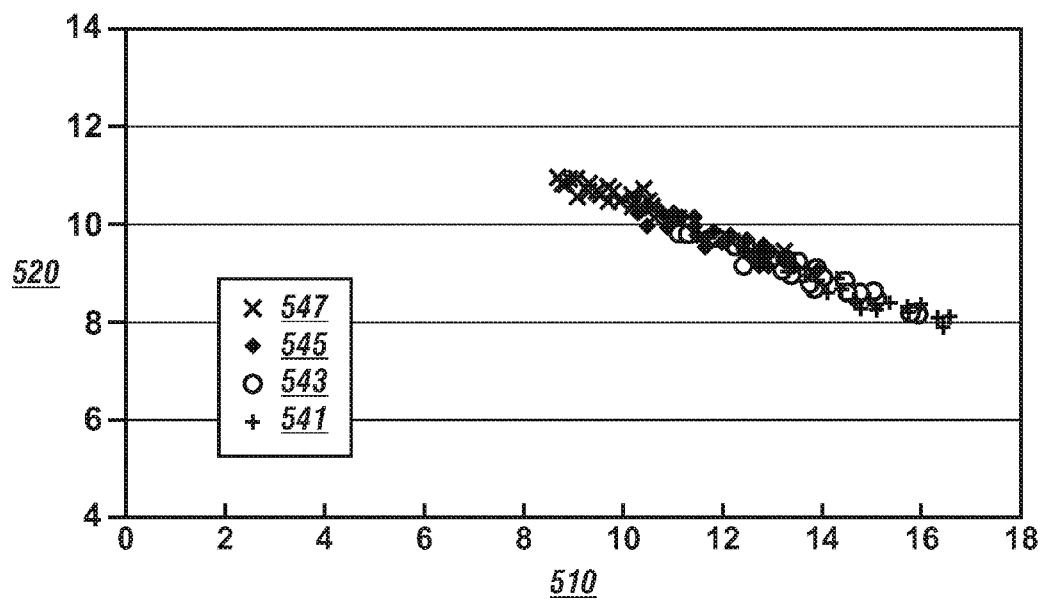
FIG. 8 graphically depicts a ratio of peak cylinder pressure in relation to indicated mean effective pressure (IMEP) plotted in relation to combustion timing, i.e., CA50 mass-burn-fraction points for coolant temperature states for an exemplary internal combustion engine operating in HCCI combustion mode in accordance with the disclosure.

FIG. 8 graphically depicts a ratio of peak cylinder pressure in relation to IMEP 520 plotted in relation to combustion timing, i.e., CA50 mass-burn-fraction 510 (CA deg aTDC) for coolant temperature states including 80° C. 541, 85° C. 543, 90° C. 545, and 95° C. 547 for an exemplary internal combustion engine operating in HCCI combustion mode, indicating an advance in combustion timing, i.e., movement toward TDC and increase in the ratio of peak cylinder pressure in relation to IMEP with increasing coolant temperature. The contribution of the coolant temperature on the effective temperature $T_{EFF}$ may be determined by evaluating the relationship between the output parameters of combustion performance and combustion timing and the input parameter of engine coolant temperature.

The results depicted in FIGS. 5, 6, 7, and 8 indicate that the intake air temperature influences combustion timing in the same way, although not necessarily in the same magnitude, as the coolant temperature. In one embodiment, a change in the intake air temperature has an influence on the heat release rate that is 0.89 times that of a change in the coolant temperature. The intake air temperature may be directly measured to provide a magnitude of the temperature bias term associated with the intake air temperature $T_{INT}$.

It is appreciated that similar evaluations may be developed to determine contributions of the various engine environment factors on the effective temperature $T_{EFF}$.

For the development as well as for the query of the calibration table the effective temperature $T_{EFF}$ takes into account the engine environment factors or any subset of the engine environment factors, including coolant temperature, engine load, intake air temperature, ambient humidity, engine altitude, fuel temperature, and combustion chamber deposits. The effective temperature $T_{EFF}$ may be used in a feed-forward control scheme to avoid marginal engine operation or engine misfire events, including during combustion mode transitions.

The disclosure has described certain preferred embodiments and modifications thereto. Further modifications and alterations may occur to others upon reading and understanding the specification. Therefore, it is intended that the disclosure not be limited to the particular embodiment(s) disclosed as the best mode contemplated for carrying out this disclosure, but that the disclosure will include all embodiments falling within the scope of the appended claims.

The invention claimed is:

1. A method for operating an internal combustion engine, comprising:
    determining a first integrated thermal state parameter corresponding to engine environment factors affecting a combustion parameter during engine operation in a homogeneous-charge compression-ignition combustion mode;
    determining a difference in the first integrated thermal state parameter corresponding to a difference between a monitored state for the combustion parameter and an estimated state for the combustion parameter;
    correcting the first integrated thermal state parameter in response to the difference in the first integrated thermal state parameter; and
    controlling operation of the internal combustion engine in response to the corrected first integrated thermal state parameter.

2. The method of claim 1, wherein determining the first integrated thermal state parameter comprises calculating the first integrated thermal state parameter in accordance with the following relationship:

$$T_{EFF} = a_0 + \Sigma_{i=1}^{n} a_i * f_i(T_i)$$

wherein $T_{EFF}$ represents the integrated thermal state parameter,
    $f_i(T_i)$ represents an array of engine environment factors affecting the combustion parameter,
    n represents a quantity of the engine environment factors,
    $a_0$ represents a bias term, and $a_i$ represents a plurality of weighting terms, wherein each of the weighting terms corresponds to an effect of one of said engine environment factors on the combustion parameter.

3. The method of claim 1, wherein correcting the first integrated thermal state parameter comprises:

calculating the first integrated thermal state parameter in accordance with the following relationship:

$$T_{EFF} = a_0 + \Sigma_{i=1}^{n} a_i * fi(T_i)$$

wherein $T_{EFF}$ represents the integrated thermal state parameter,
$f_i(T_i)$ represents an array of engine environment factors affecting the combustion parameter,
n represents a quantity of the engine environment factors,
$a_0$ represents a bias term, and
$a_i$ represents a plurality of weighting terms, wherein each of the weighting terms corresponds to an effect of one of said engine environment factors on the combustion parameter; and updating the weighting terms in response to the difference between the monitored state for the combustion parameter and the estimated state for the combustion parameter.

4. The method of claim 1, wherein:
the combustion parameter comprises combustion timing;
the monitored state for combustion timing corresponds to monitored in-cylinder combustion pressure; and
the estimated state for combustion timing corresponds to monitored engine states and engine control parameters.

5. The method of claim 1, wherein determining the first integrated thermal state parameter comprises aggregating said engine environment factors in relation to their individual effects upon combustion heat release.

6. The method of claim 5, wherein aggregating said engine environment factors in relation to their individual effects upon combustion heat release comprises aggregating of the engine environment factors in relation to their effect upon combustion timing.

7. The method of claim 5, wherein said engine environment factors correspond to coolant temperature, engine load and engine load history, intake air temperature, ambient humidity, altitude, fuel quality, and combustion chamber deposits.

8. The method of claim 1, wherein controlling operation of the internal combustion engine in response to the corrected first integrated thermal state parameter achieves a preferred state for the combustion parameter.

9. The method of claim 8, wherein controlling operation of the internal combustion engine in response to the corrected first integrated thermal state parameter comprises executing a feed-forward engine control scheme to determine states for engine control parameters associated with the corrected first integrated thermal state parameter to achieve the preferred state for the combustion parameter.

10. The method of claim 8, wherein controlling operation of the internal combustion engine in response to the corrected first integrated thermal state parameter comprises executing a feedback engine control scheme to determine states for engine control parameters associated with the corrected first integrated thermal state parameter to achieve the preferred state for the combustion parameter.

11. A method for operating an internal combustion engine, wherein a control module performs the following steps:

determining a first integrated thermal state parameter adjusted based upon a difference between a monitored combustion parameter and an estimated combustion parameter; and controlling operation of the internal combustion engine in a homogeneous-charge compression-ignition combustion mode in response to the adjusted first integrated thermal state parameter.

12. The method of claim 11, wherein determining the first integrated thermal state parameter comprises:

calculating the first integrated thermal state parameter in accordance with the following relationship:

$$T_{EFF} = a_0 \Sigma_{i=1}^{n} a_i * fi(T_i)$$

wherein $T_{EFF}$ represents the integrated thermal state parameter,
$f_i(T_i)$ represents an array of engine environment factors affecting the combustion parameter,
n represents a quantity of the engine environment factors,
$a_0$ represents a bias term, and
$a_i$ represents a plurality of weighting terms, wherein each of the weighting terms corresponds to an effect of one of said engine environment factors on the combustion parameter; and adjusting the weighting terms in response to the difference between the monitored state for the combustion parameter and the estimated state for the combustion parameter.

13. The method of claim 11, wherein:
the combustion parameter comprises combustion timing;
the monitored combustion timing corresponds to monitored in-cylinder combustion pressure; and
the estimated combustion timing corresponds to monitored engine states and engine control parameters.

14. A method for operating an internal combustion engine, comprising:
determining a corrected first integrated thermal state parameter corresponding to engine environment factors affecting a combustion parameter; and
controlling operation of the internal combustion engine in response to the corrected first integrated thermal state parameter.

15. The method of claim 14, wherein determining the corrected first integrated thermal state parameter comprises:

calculating the first integrated thermal state parameter in accordance with the following relationship:

$$T_{EFF} = a_0 + \Sigma_{i=1}^{n} a_i * fi(T_i)$$

wherein $T_{EFF}$ represents the integrated thermal state parameter,
$f_i(T_i)$ represents an array of engine environment factors affecting the combustion parameter,
n represents a quantity of the engine environment factors,
$a_0$ represents a bias term, and
$a_i$ represents a plurality of weighting terms, wherein each of the weighting terms corresponds to an effect of one of said engine environment factors on the combustion parameter; and updating the weighting terms in response to a difference between a monitored state for the combustion parameter and an estimated state for the combustion parameter.

* * * * *